United States Patent
Bai et al.

(10) Patent No.: US 11,238,247 B2
(45) Date of Patent: Feb. 1, 2022

(54) RFID TAG AND READER

(71) Applicant: RFID TECHNOLOGIES PTY LTD, Queenscliff (AU)

(72) Inventors: Yanfu Bai, North Melbourne (AU); Nigel Wing, Alphington (AU); Nemai Chandra Karmakar, Wheelers Hill (AU); Md Shakil Bhuiyan, Clayton (AU)

(73) Assignee: RFID Technologies Pty Ltd, Queenscliff (AU)

(*) Notice: Subject to any disclaimer, the term of this patent is extended or adjusted under 35 U.S.C. 154(b) by 155 days.

(21) Appl. No.: 15/566,203

(22) PCT Filed: Apr. 8, 2016

(86) PCT No.: PCT/AU2016/050262
§ 371 (c)(1),
(2) Date: Oct. 12, 2017

(87) PCT Pub. No.: WO2016/164970
PCT Pub. Date: Oct. 20, 2016

(65) Prior Publication Data
US 2018/0114041 A1    Apr. 26, 2018

(30) Foreign Application Priority Data

Apr. 13, 2015  (AU) .................................. 2015901308
Oct. 21, 2015  (AU) .................................. 2015904327

(51) Int. Cl.
*G06K 7/10*      (2006.01)
*G06K 19/067*    (2006.01)
(Continued)

(52) U.S. Cl.
CPC ......... *G06K 7/10326* (2013.01); *G06K 7/086* (2013.01); *G06K 19/025* (2013.01);
(Continued)

(58) Field of Classification Search
CPC ......... G06K 7/10326; G06K 19/07788; H01Q 1/2216; H01Q 21/24
See application file for complete search history.

(56) References Cited

U.S. PATENT DOCUMENTS 4,985,686 A * 1/1991 Davidson .............. H03F 1/3223
                                                330/124 R
5,564,087 A * 10/1996 Cygan .................... H03F 1/34
                                                455/115.1
(Continued)

FOREIGN PATENT DOCUMENTS

CN    102 222 249 B    3/2013
JP    2006-186984 A    7/2006
(Continued)

OTHER PUBLICATIONS

International Search Report dated Jun. 27, 2016 in International Application No. PCT/AU2016/050262, filed Apr. 8, 2016, in 5 pages.
(Continued)

*Primary Examiner* — Daniel I Walsh
(74) *Attorney, Agent, or Firm* — Knobbe, Martens, Olson & Bear, LLP

(57) ABSTRACT

A radio frequency identification (RFID) tag and reader system including an array of circular resonators with interdigitated capacitor fingers wherein the fingers of each pair are radially aligned and bars disposed between the resonators to reduce coupling between adjacent resonators, wherein subsets of the resonators resonate at respective different resonant frequencies, and the resonators of each of the subsets have the same resonant frequency; and the radio frequency response produced by the tag at a resonant frequency varies depending on the activation of resonators of the subset corresponding to the resonant frequency.

9 Claims, 13 Drawing Sheets

(51) Int. Cl.
*H01Q 1/22* (2006.01)
*G06K 19/02* (2006.01)
*G06K 7/08* (2006.01)
*G06K 19/077* (2006.01)
*H01P 1/203* (2006.01)
*H01Q 7/00* (2006.01)
*H01Q 21/24* (2006.01)

(52) U.S. Cl.
CPC ..... *G06K 19/0672* (2013.01); *G06K 19/0677* (2013.01); *G06K 19/07788* (2013.01); *H01P 1/20381* (2013.01); *H01Q 1/2216* (2013.01); *H01Q 1/2225* (2013.01); *H01Q 7/00* (2013.01); *H01Q 21/24* (2013.01)

(56) References Cited

U.S. PATENT DOCUMENTS

| | | | |
|---|---|---|---|
| 6,069,589 A | 5/2000 | Lewis, Jr. et al. | |
| 6,353,406 B1* | 3/2002 | Lanzl | G01S 13/84 340/10.1 |
| 6,700,931 B1* | 3/2004 | Lee | H04L 25/4902 329/313 |
| 10,243,719 B2* | 3/2019 | Bharadia | H04B 1/525 |
| 2003/0027361 A1* | 2/2003 | Lempkowski | G02F 1/0136 438/3 |
| 2003/0027543 A1* | 2/2003 | Takaki | H03G 3/3068 455/324 |
| 2004/0127173 A1* | 7/2004 | Leizerovich | H03F 1/02 455/93 |
| 2004/0203478 A1* | 10/2004 | Scott | G06K 7/0008 455/70 |
| 2005/0038982 A1* | 2/2005 | Park | G06F 1/162 713/1 |
| 2005/0200528 A1* | 9/2005 | Carrender | H01Q 1/22 343/700 MS |
| 2005/0225433 A1* | 10/2005 | Diorio | G06K 19/0723 340/10.4 |
| 2005/0225434 A1* | 10/2005 | Diorio | G06K 19/0723 340/10.4 |
| 2005/0227644 A1* | 10/2005 | Maslennikov | H03F 1/02 455/127.1 |
| 2005/0237160 A1* | 10/2005 | Nolan | G06K 19/0705 340/10.33 |
| 2005/0242875 A1* | 11/2005 | Gurvich | H03F 1/32 330/136 |
| 2005/0280508 A1* | 12/2005 | Mravca | G06K 7/0008 340/10.2 |
| 2006/0160506 A1* | 7/2006 | Smentek | H03G 3/3084 455/127.3 |
| 2006/0202033 A1* | 9/2006 | Campero | G06K 7/0008 235/436 |
| 2006/0267772 A1* | 11/2006 | Knadle, Jr. | G06K 7/0004 340/572.4 |
| 2007/0075839 A1* | 4/2007 | Ho | G07B 15/06 340/10.2 |
| 2007/0194929 A1* | 8/2007 | Wagner | G06K 7/10346 340/572.7 |
| 2007/0194932 A1* | 8/2007 | Oishi | H04B 1/525 340/572.7 |
| 2007/0202811 A1* | 8/2007 | Chanowitz | H04B 5/0062 455/67.12 |
| 2007/0275673 A1* | 11/2007 | Chen | G06K 7/0008 455/78 |
| 2008/0293352 A1* | 11/2008 | Posamentier | H04B 1/525 455/1 |
| 2009/0049411 A1* | 2/2009 | Shim | G06F 3/0482 715/841 |
| 2009/0058612 A1* | 3/2009 | Chung | G06K 7/10069 340/10.2 |
| 2009/0160610 A1* | 6/2009 | Doddamane | G06F 7/588 340/10.1 |
| 2009/0196373 A1* | 8/2009 | Snook | G06K 7/0008 375/269 |
| 2009/0232260 A1* | 9/2009 | Hayashi | H04B 1/525 375/346 |
| 2009/0268642 A1* | 10/2009 | Knox | H04L 12/66 370/277 |
| 2009/0303006 A1* | 12/2009 | Eggers | H04Q 9/00 340/10.1 |
| 2010/0152600 A1* | 6/2010 | Droitcour | A61B 5/05 600/534 |
| 2010/0176928 A1* | 7/2010 | Isomura | G06K 7/0008 340/10.3 |
| 2010/0225580 A1* | 9/2010 | Yoon | G06F 3/0304 345/157 |
| 2011/0050346 A1* | 3/2011 | Schroth | H03F 3/189 330/284 |
| 2011/0168695 A1* | 7/2011 | Okajima | H05B 6/70 219/647 |
| 2011/0175805 A1* | 7/2011 | Rottler | G09G 5/00 345/156 |
| 2013/0078848 A1* | 3/2013 | Kummetz | H04Q 1/138 439/488 |
| 2013/0229262 A1* | 9/2013 | Bellows | H01Q 1/007 340/10.1 |
| 2014/0022285 A1* | 1/2014 | Stovicek | G06F 1/1694 345/650 |
| 2015/0108210 A1* | 4/2015 | Zhou | H04W 4/02 235/375 |
| 2015/0310327 A1* | 10/2015 | Karmakar | H01Q 1/2225 340/10.1 |
| 2016/0048826 A1* | 2/2016 | Fefferman | G06Q 20/3274 705/23 |
| 2017/0180166 A1* | 6/2017 | Zhou | H04L 25/03885 |
| 2017/0276763 A1* | 9/2017 | Howard | G01S 5/04 |
| 2018/0114041 A1* | 4/2018 | Bai | G06K 7/10326 |
| 2018/0233798 A1* | 8/2018 | Moriguchi | H01P 5/222 |
| 2020/0091608 A1* | 3/2020 | Alpman | H01Q 1/38 |

FOREIGN PATENT DOCUMENTS

| | | | |
|---|---|---|---|
| JP | 2008187227 A | * | 8/2008 |
| KR | 10-2008-0099979 A | | 11/2008 |
| WO | WO 2014/085857 A1 | | 6/2014 |

OTHER PUBLICATIONS

Written Opinion dated Jun. 27, 2016 in International Application No. PCT/AU2016/050262, filed Apr. 8, 2016, in 8 pages.
Islam, *Compact Printable Chipless RFID Systems*, A thesis submitted in total fulfillment of the requirements for the degree of Doctor of Philosophy, Department of Electrical and Computer Systems Engineering, Monash University, Jun. 2014, pp. 1-284.
Small UHF RFID Antenna 5dBi RHCP Circular Polarization Vanch VA-95, pp. 1-4 [retrieved from internet Jun. 3, 2016] URL:http://www.alibaba.com/productdetail/Small-UHF-RFID-Antenna-5dBi-RHCP_58413837.html.
VA95 Asset Tracking Antenna, Shenzhen Vanch intelligent technology Co., Ltd, [retrieved from internet Jun. 20, 2016] URL:http://www.vanch.net/en/pro/show/80.html published Jun. 4, 2014 as per Wayback machine.
Extended European Search Report dated Mar. 26, 2019 in European Application No. 16779330.6, in 12 pages.

* cited by examiner

Figure 13

RFID TAG AND READER

FIELD

The present invention relates to a radio frequency identification (RFID) tag, and an RFID reader that is capable of reading the tag.

BACKGROUND

Radio frequency identification (RFID) systems are based on the use of a RFID tag which is a radio frequency transponder that can be attached to an object. The tag is encoded or stored with a unique identification code that can be used to identify the object. The code is read wirelessly from the RFID tag by an RFID reader of the system.

Chipless or passive RFID tags are used to reduce costs by omitting any active processing circuitry, such as a microcontroller, from the tag. A chipless or passive RFID tag should be inexpensive, small in size, flexible, able to be accurately read, and have an encoded data capacity of a significant number of bits to allow a large number of unique identification codes to be represented by the bits. The tag should also be printable, or produced using an inexpensive and accurate fabrication process.

Significant challenges exist to produce tags that possess all of these desired characteristics, and in particular which can be produced with accuracy by printing, etching or chemical deposition. The frequency band of operation should also be selectable in order to comply with regulatory constraints in different jurisdictions.

Other significant challenges are encountered when developing a RFID reader that is able to determine if a tag is within range of the radio frequency field of the reader, particularly when operating at microwave frequencies. Also, microwave components are sensitive, particularly to ambient temperature, and can naturally drift in their response over time. Accordingly the frequency response of the receiver of a reader can vary and this needs to be addressed to ensure tags are detected and accurately read.

It is desired to address the above, or at least provide a useful alternative.

SUMMARY

At least one embodiment of the present invention provides a radio frequency identification (RFID) tag, including:
an array of circular resonators with pairs of interdigitated capacitor fingers;
wherein the fingers of each pair are radially aligned.

One pair of fingers may be orthogonal to the another pair.

Cross bars may be disposed about the resonators to avoid radio frequency coupling between adjacent resonators.

Subsets of the resonators may resonate at respective different resonant frequencies, with the resonators of a subset having the same resonant frequency. The response at a resonant frequency produced by the tag varies in amplitude depending on the number of active resonators of the subset. The amplitude response across the resonant frequencies of the tags represents encoded data of the tag. The encoded data of the response may be different for the X-polarisation and Y-polarisation responses so that the encoded data of each polarisation response is used to provide the unique identification code of the tag.

The tag is able to operate in the 20-30 GHz frequency band, and preferably in the 22 to 26.5 Ghz band. Discrete bands within these bands may be excluded from the resonant frequencies of the tag to meet regulatory requirements.

A resonator may be deactivated (i.e. turned off) in a polarisation direction by removing a gap associated with a pair of the fingers.

At least one of the embodiments of the invention also provides a radio frequency identification (RFID) reader that transmits X and Y polarised radio frequency signals to the tag and also receives and processes X and Y polarised radio frequency signals from the tag. The reader has a rotating head and is able to read first encoded data in one polarisation and second encoded data of the tag in another polarisation, and combine the first and second encoded data to produce the unique identification code of the tag. The reader includes a transmitter and a receiver with respective voltage controlled oscillators, and a processor operating with the receiver provides feedback to a controller for the oscillators so the transmitter and receiver are in alignment and operating at the same resonant frequency.

The tag may include inductive metallic film on a capacitive insulating substrate, and the resonators may be produced by laser etching the film. The film may be aluminium, and the substrate may be BOPP or Mylar.

At least one embodiment of the present invention also provides a radio frequency identification (RFID) tag, including:
an array of resonators with interdigitated capacitor fingers; and
bars disposed between the resonators to reduce coupling between adjacent resonators:
wherein subsets of the resonators resonate at respective different resonant frequencies, and the resonators of each of the subsets have the same resonant frequency; and
the radio frequency response produced by the tag at a resonant frequency varies depending on the activation of resonators of the subset corresponding to the resonant frequency.

At least one embodiment of the present invention also provides a radio frequency identification (RFID) reader for a tag as claimed in any one of the preceding claims, including:
a transmitter to transmit X and Y polarised radio frequency signals to the tag; and
a receiver to receive and processes X and Y polarised radio frequency signals from the tag;
said receiver obtaining first encoded data of the tag in one polarisation and second encoded data of the tag in another polarisation, the first and second encoded data providing a unique identification code of the tag.

At least one embodiment of the present invention provides a radio frequency identification (RFID) reader for a tag, including:
a transmitter with a local oscillator to transmit radio frequency signals in sweeps across desired resonant frequency bands to the tag; and
a receiver synchronised to receive and processes radio frequency signals of said desired frequency bands from the tag.

The reader may include a variable attenuator which receives a reference signal representing the transmitted signal and adjusts the reference signal for the receiver at different frequencies across the bands to control the sensitivity of the receiver; and/or a signal processor for normalising a frequency response of the receiver based on a response obtained from calibration resonators of the tag.

DESCRIPTION OF THE DRAWINGS

Preferred embodiments of the present invention are hereinafter described, by way of example only, with reference to the accompanying drawings, wherein:

FIG. 13 is a diagram illustrating the resonant frequency allocation of the resonators of the alternative RFID tag.

DETAILED DESCRIPTION

Figure 1:
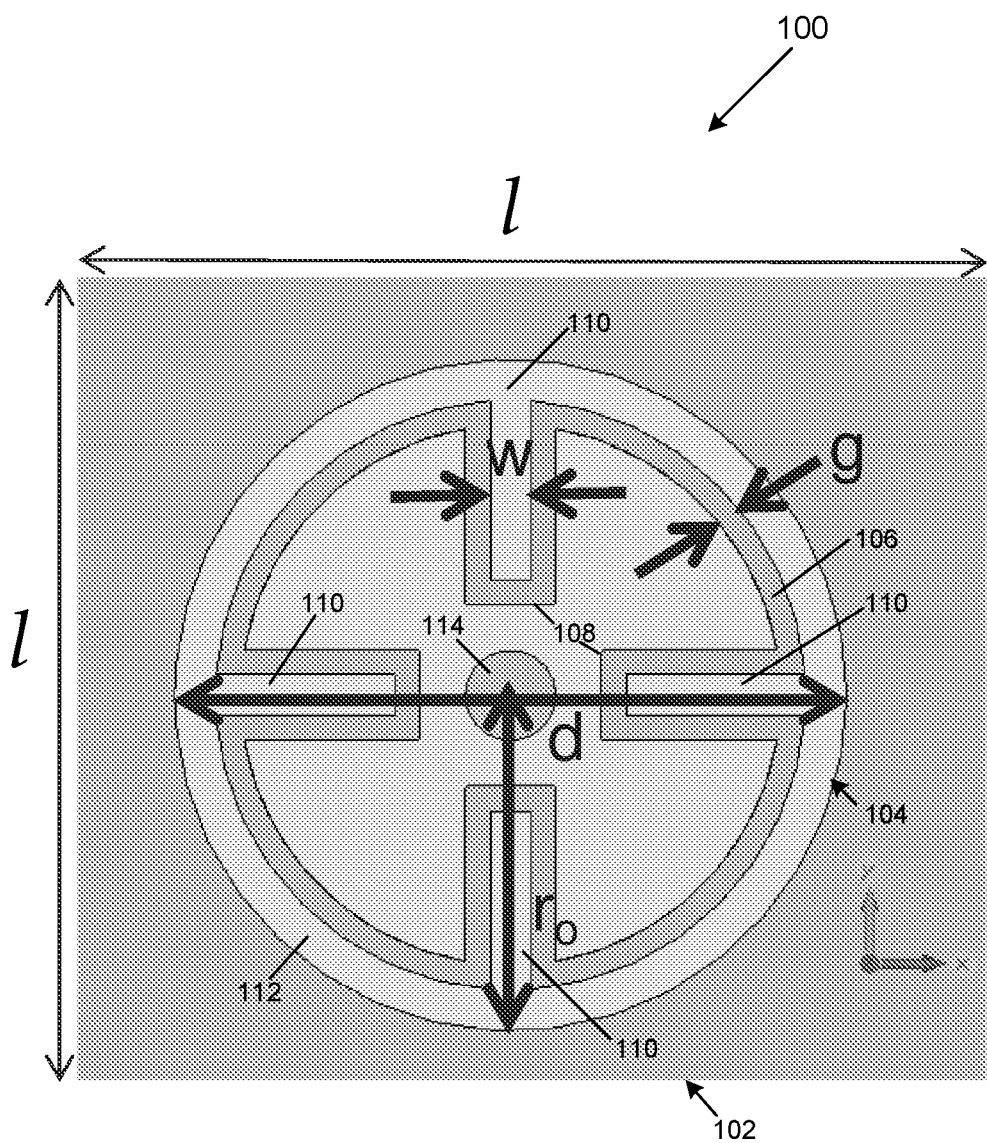
FIG. 1 is a plan view of a circular interdigitated capacitor (IDC) resonator of a preferred embodiment of a radio frequency identification (RFID) tag.
Figure 8:
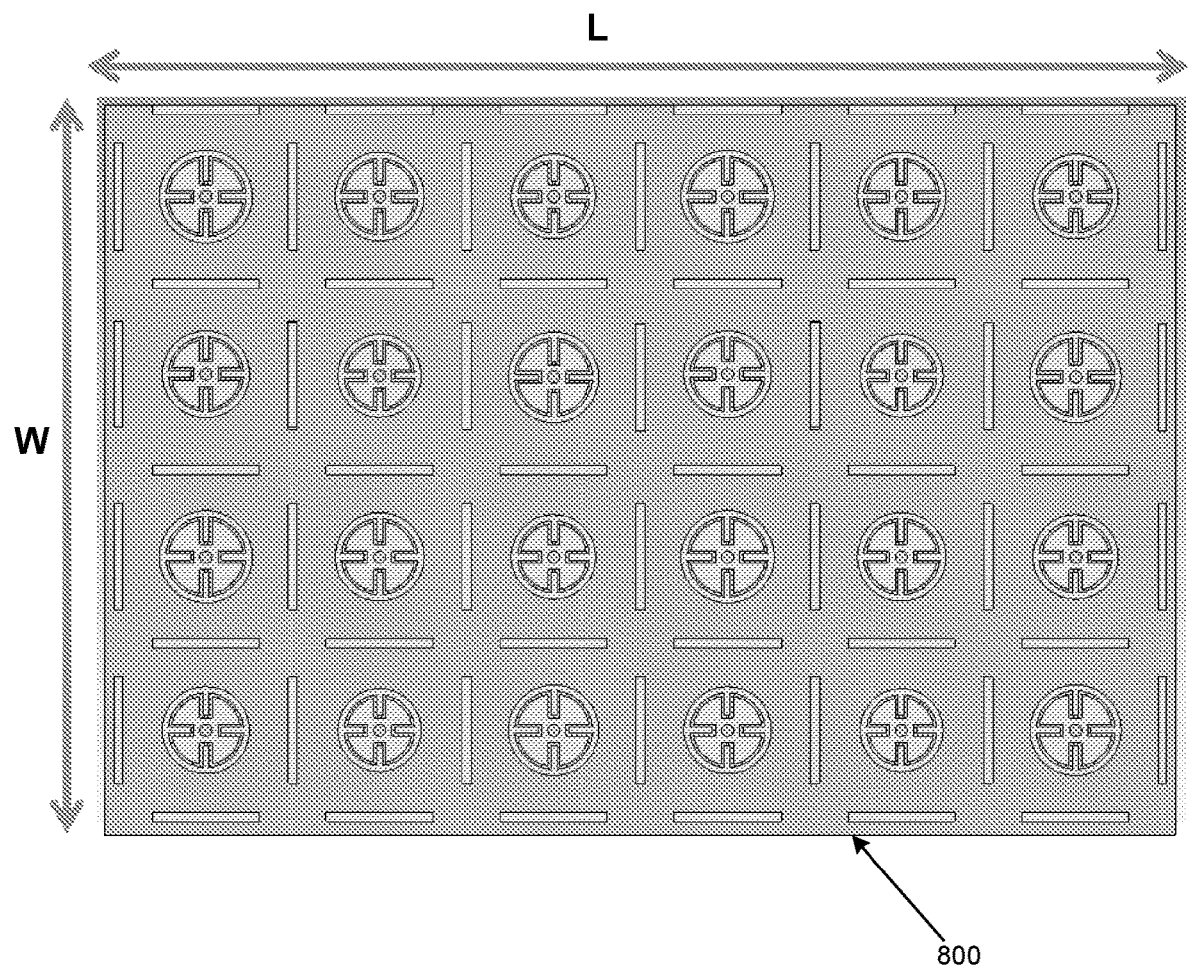
FIG. 8 is a plan view of the RFID tag with a 6×4 resonator array and cross bars.

A radio frequency identification (RFID) tag 800, as shown in FIG. 8, includes an array of circular interdigitated capacitor (IDC) resonators 100, as shown in FIG. 1. The resonator 100 comprises an insulating substrate 102 and a metallic film 104 disposed on the substrate. The film 104 is printed, etched or chemically deposited on the substrate so that the film 104 has the characteristic shape and slots and gaps illustrated. The substrate 102 may have adhesive on the side opposite to the side of the film 104 so the tag 800 can be adhered to an object to be identified. The dimension/of the sides of the resonator 100 is less than 4 mm. The metallic film 104 is a circle or disc with a circumferential slot or gap 106 where the substrate 102 is exposed. The gap 106 is circumferential except at 90° points where it extends towards the centre of the disc to produce four rectangular notches 108. The notches 108 produce four rectangular interdigitated capacitor (IDC) fingers or spokes 110 of the film 104 that extend from the outer rim 112 of the film into the notches 108 towards the centre of the film 104. A circular gap 114 is also disposed in the centre of the resonator 100 to expose the substrate 102. The film 104 therefore provides a circular IDC resonator 100 that has a wheel shaped layout. The inductive properties of the metallic film 104 and the capacitive properties of the substrate material 102 are used to provide the microwave resonator 100.

A pair of fingers 110 of the resonator 100 are radially aligned, and the resonator 100 has two pairs of fingers 110, where one pair is orthogonal or perpendicular to the other pair. By changing one pair, or shorting one pair, as described below, the resonator 100 is able to produce a different response for radio frequency signals polarised in different directions, i.e. signals with an X polarisation and signals with a Y polarisation.

Figure 2:
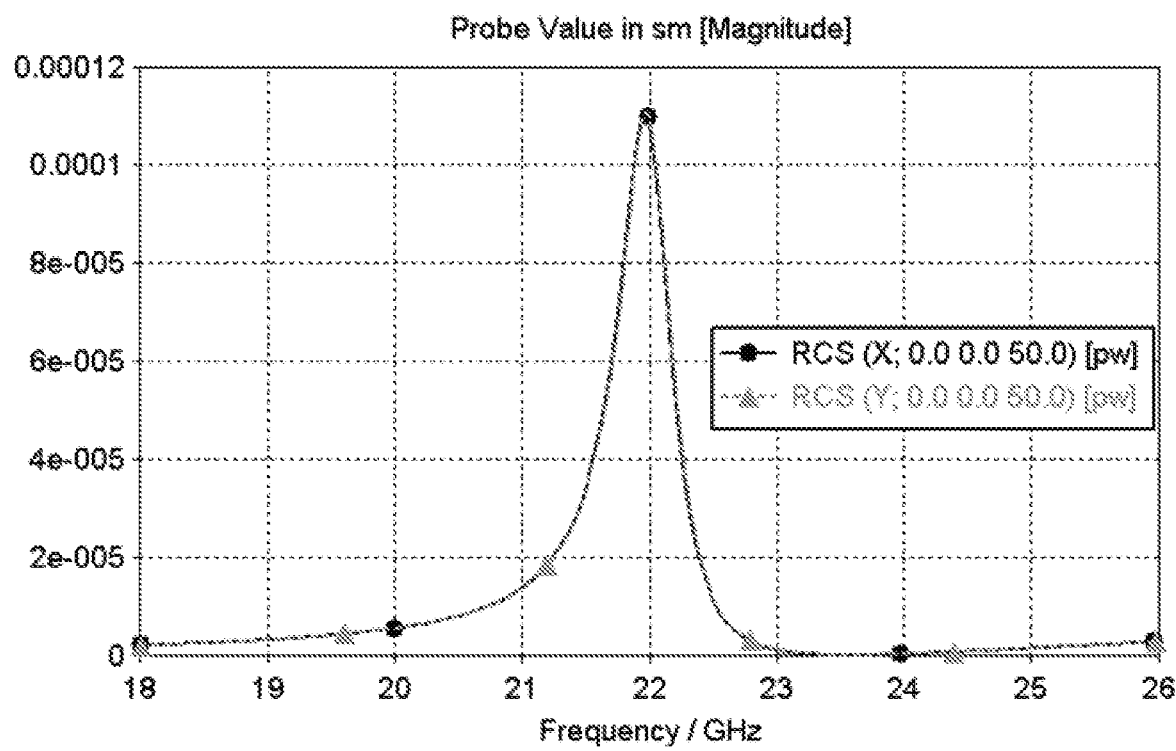
FIG. 2 is a graph of the resonance signature of the resonator.

The diameter d of the circular resonator 100 is 2.96 mm, and the width w of the fingers 110 and the rim 112 is 200 μm. The gap width g of the gap 106 and notches 108 is 100 μm. With a single layer aluminium metal film 104 on a Mylar substrate 102, the frequency response or resonance signature produced by the resonator 100 is shown in FIG. 2. This illustrates the resonant frequency of 22 GHz.

Figure 3:
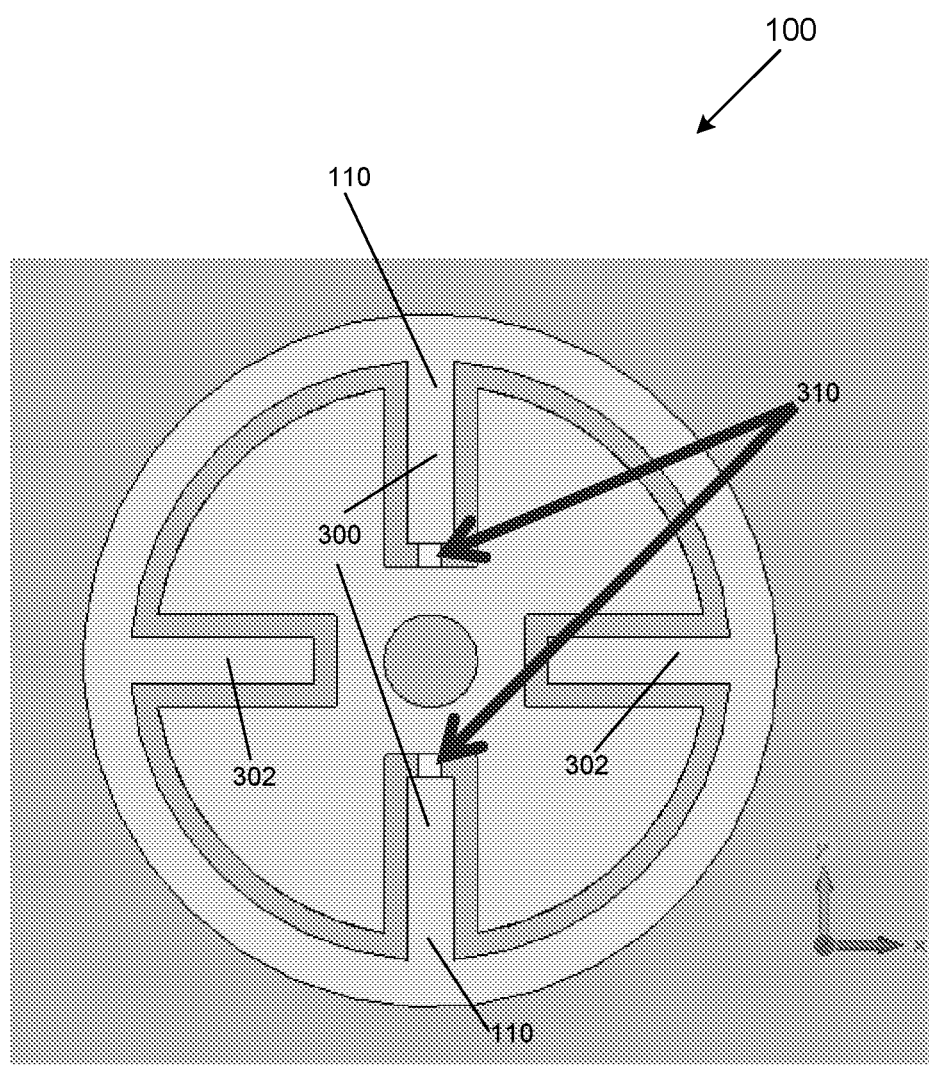
FIG. 3 is a plan view of the resonator with a pair of IDC fingers short circuited.
Figure 4:
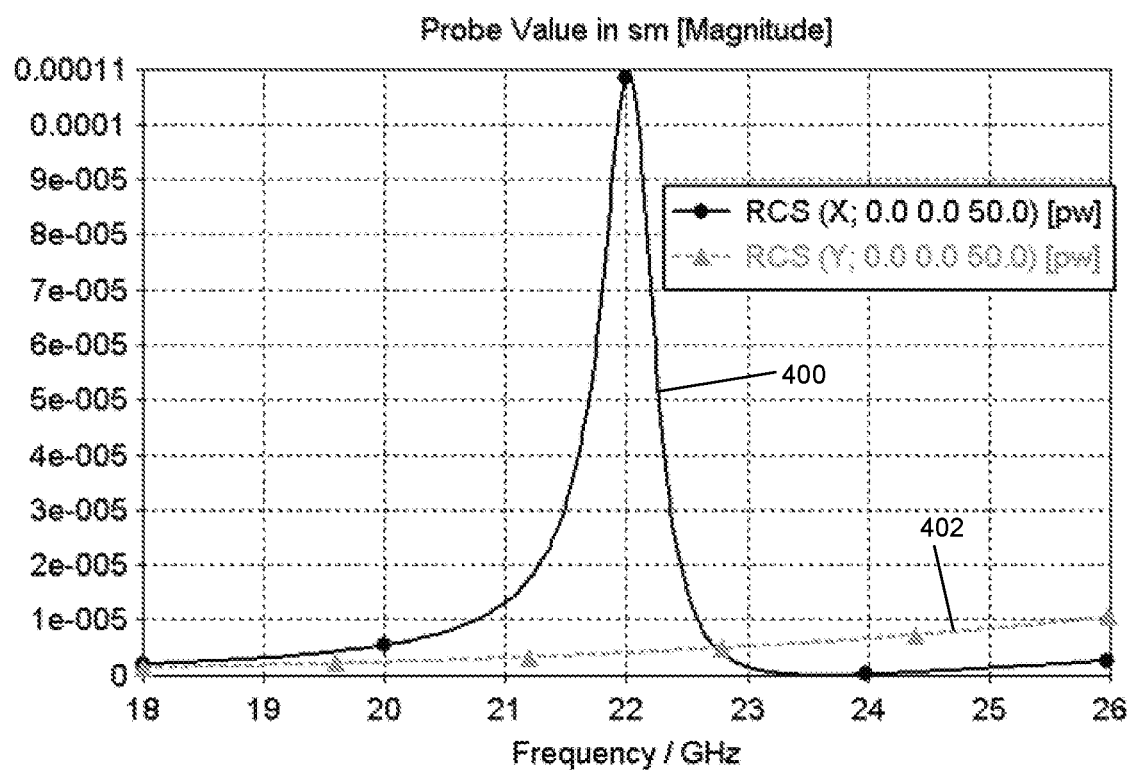
FIG. 4 is a graph of the frequency response of the short circuited resonator.

The resonator 100 can be detuned, deactivated or turned off in one of the polarisation directions, i.e. deactivated for the Y polarisation direction, as shown in FIG. 3, by short circuiting a pair 300 of the fingers 110 in the Y direction. The pair is short circuited by simply removing the gap g at the end of the fingers 110 of the pair 300. The gap can be removed by adding a metal short 302 at the end of the fingers 110. This produces a frequency response, as shown in FIG. 4, where there is no change to the response in the X polarisation 400, but the Y polarisation response 402 is effectively detuned, deactivated or turned off. Accordingly, the resonator 100 is able to encode two bits of information. By activating (turning on) or deactivating (turning off) each of the two pairs 300 or 302 selectively and reading the response in X and Y polarisation directions at the resonant frequency of the resonator 100, the amplitude of the X polarisation and Y polarisation responses will each represent a bit that is either 1 or 0.

Figure 5:
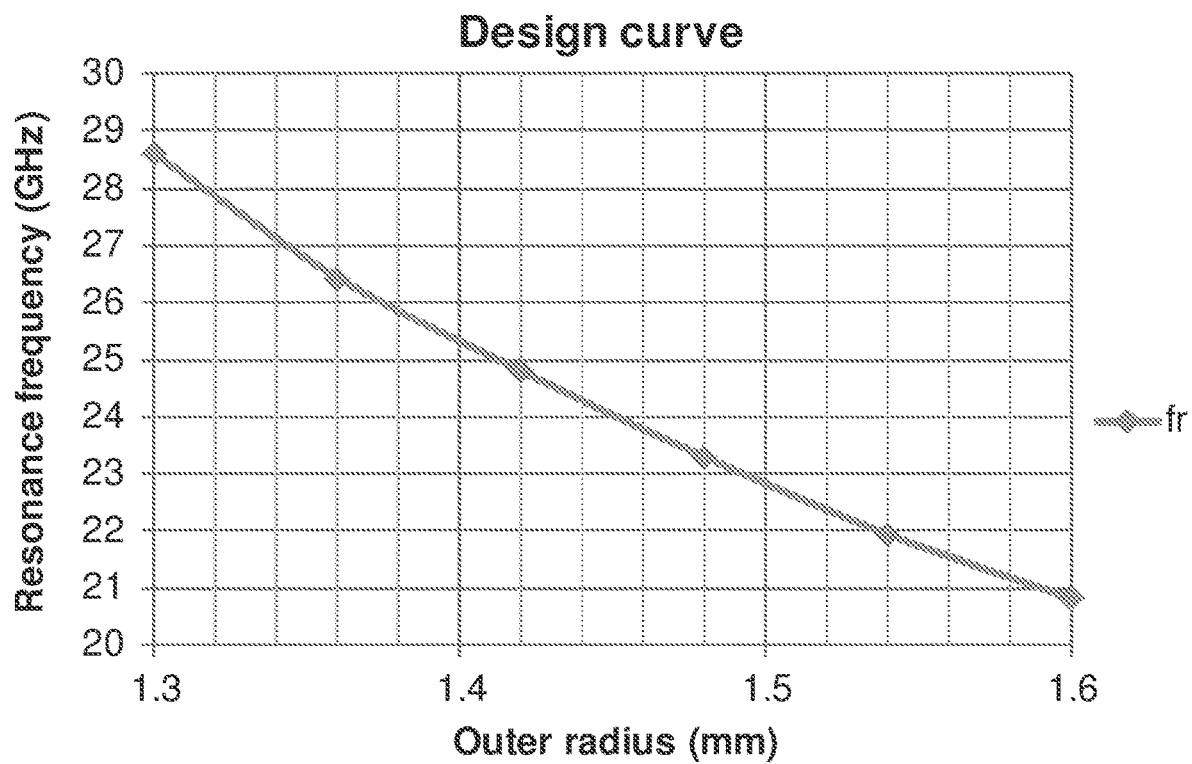
FIG. 5 is a graph of the resonant frequency of the resonator relative to a resonator's radius.

The resonant frequency of the resonator 100 is adjusted and determined based on the radius $r_0$ of the film 104. FIG. 5 illustrates how the resonance frequency varies based on the dimension of the radius $r_0$. The resonator 100 and the tag 800 operates over the microwave frequency band of 20 to 30 GHz, and preferably 22 to 26.5 GHz. The resonant frequency can also be controlled by the lengths of the fingers 110 and the width of the gap g. The width of the gap g controls the Q factor of the resonator 100. The higher the Q factor the sharper the resonant peaks are, and conversely the narrower the gap, the less power is reflected by the resonator 100 to a receiver 1004. The choice of gap width g is a compromise between power received and sharpness of the resonant peaks that are to be detected by the receiver 1004.

By providing a tag 800 with a number of resonators 100 at different respective resonant frequencies, the data capacity can be considerably increased. The data capacity corresponds to the number of total bits that can be encoded in the RFID tag 800. Given that the polarisation diversity in the X and Y directions adds a factor of 2 to the data capacity, the total bit capacity of a tag 800 with n distinct resonant frequencies is given by: $2 \times n \times \log_2(m)$, where m is the number of different amplitude or radio cross-section (RCS) levels that are detected.

Figure 6:
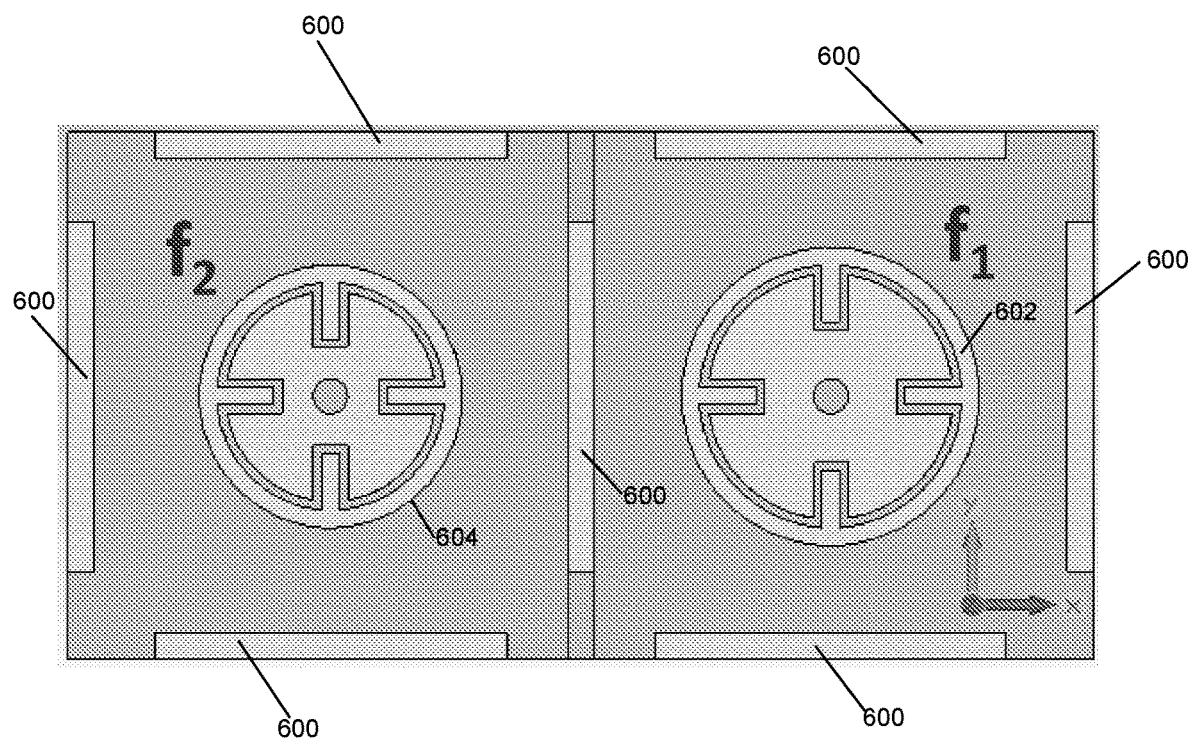
FIG. 6 is a plan view of two resonators with cross bars.
Figure 7:
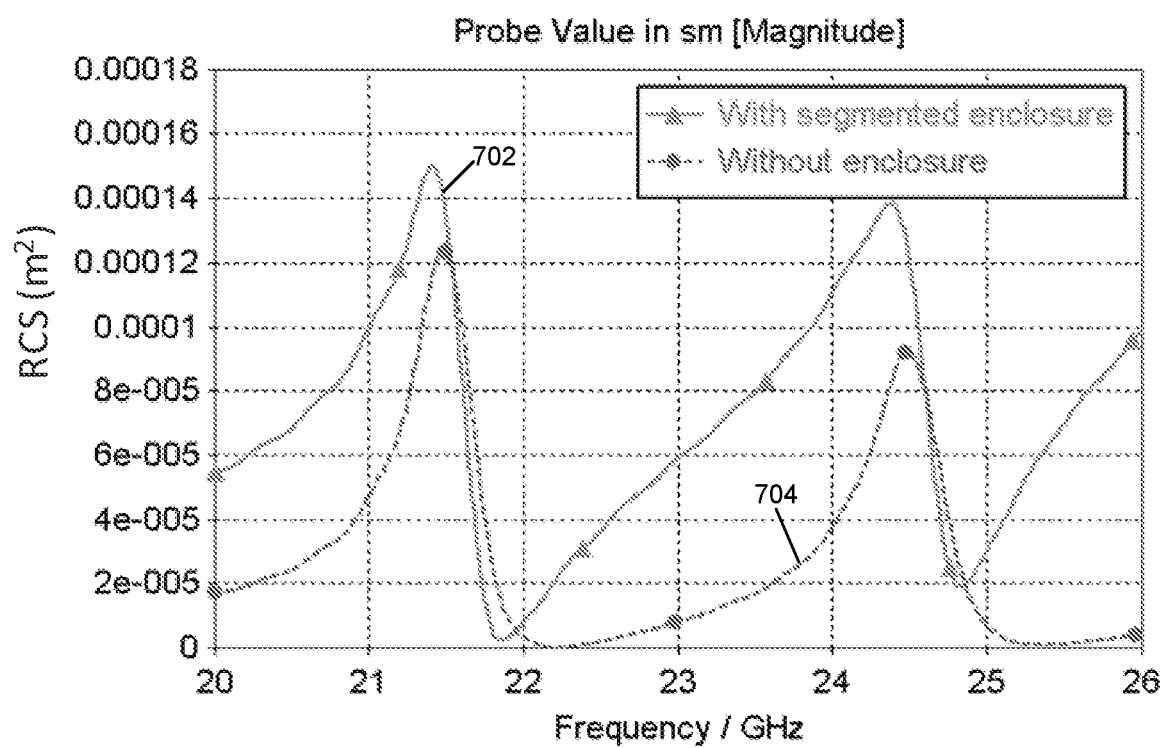
FIG. 7 is a graph of the frequency response of the resonators of FIG. 6 both with and without the cross bars.

To reduce radio frequency coupling between adjacent resonators 100, guard or cross bars 600 of the metallic film 104 are placed between adjacent resonators 100. The bars 600 have a width of 200 μm and a length that is longer than the diameter d of each resonator 100. The bars 600 are disposed on each side of the substrate 104 of the resonator 100 so that four bars 600 surround each resonator 602, 604, as shown in FIG. 6. The resonators 602 and 604 are different sizes and have different respective resonant frequencies $f_1$ and $f_2$. Only one cross or guard bar 600 is placed between the adjacent resonators 602 and 604. The frequency response for the resonators 602 and 604 with the cross bars 702 and without the cross bars 704 is shown in FIG. 7. The addition of the cross bars 600 provides an improved frequency response with more distinctive resonant peaks. The resonant frequencies are also slightly lower.

Figure 9:
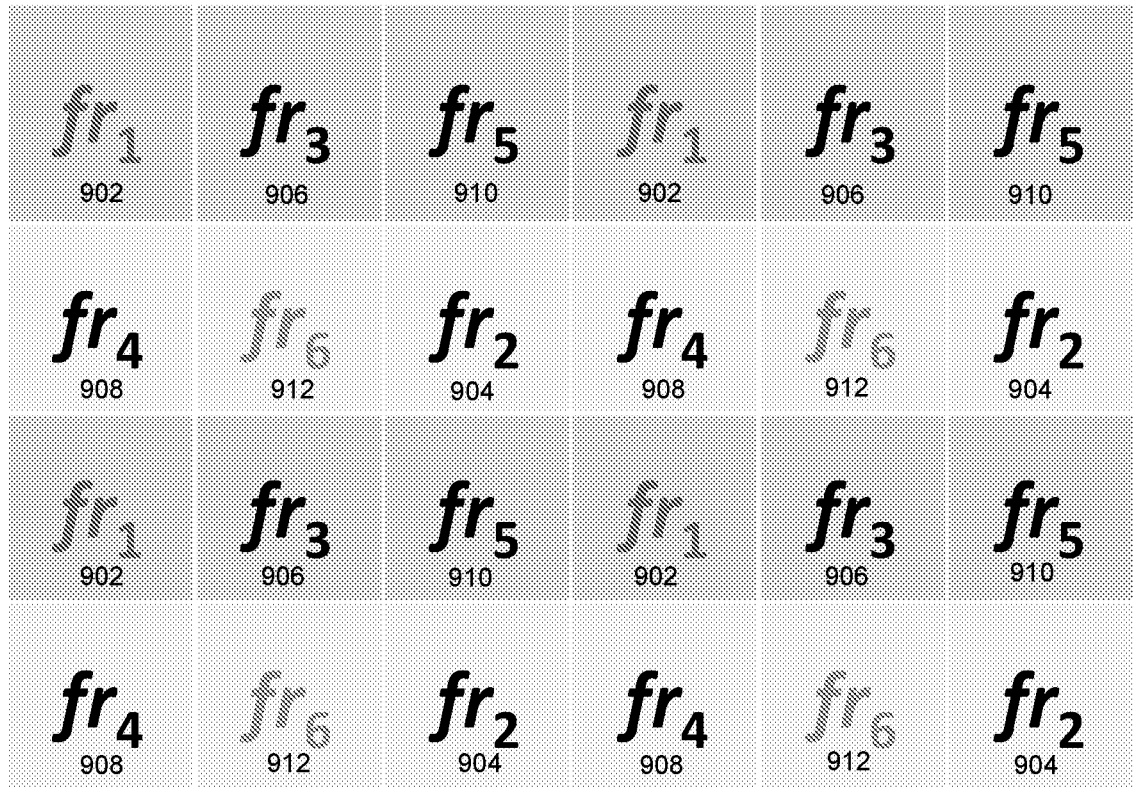
FIG. 9 is a diagram illustrating the resonant frequency allocation of the resonators of the RFID tag.

The RFID tag 800, as shown in FIG. 8, includes a 6×4 array of resonators 100 with the cross bars 600 included to reduce mutual coupling between the resonators 100. The tag operates at 6 different resonant frequencies over the 22 to 26.5 GHz band. Four resonators are each allocated the same respective resonant frequency and form one of six subsets 902, 904, 906, 908, 910 and 912 of resonators, as shown in FIG. 9, where each subset operates at a different resonant frequency. The length of the tag L is 36 mm and the width of the tag W is 24 mm. A 6×4 array was chosen for size so that the tag 800 is as small as possible and smaller than a credit card. Different arrangements for the array could be adopted, and the resonators 100, for example, could also be placed in an array with a single row or column of resonators 100.

The layout of the subsets and the allocation of the six resonant frequencies is shown in FIG. 9. The resonators of each subset 902, 904, 906, 908, 910 and 912 for each frequency are laid out on the substrate of the tag 800 to maximise the distance between resonators with the same frequency, and to also assist in reducing coupling between the resonators. With four resonators 100 for each resonant frequency, this allows four different amplitudes to be detected for each resonant frequency response for each polarisation. This gives two bits for each frequency for each polarisation, giving 12 bits in total for each polarisation, and 24 bits of data for the entire tag 800. Accordingly, when the frequency response is read from the tag 800 for one polarisation, e.g. the X polarisation response, 12 encoded bits are read, and for the other polarisation, e.g. the Y polarisation response, another 12 bits of encoded data are read. The 12 bits of each polarisation are then combined to provide 24 bits of encoded data that represents the unique identification code for the tag 800. A fifth amplitude, i.e. zero, can also be used if desired.

Advantageously however the data capacity of the tag 800 is reduced so one subset 902 of resonators can be used to provide a resonant frequency that is known and chosen as a calibration frequency. For this calibration resonant frequency, these calibration resonators of the subset 902 are all turned on or active. This allows the reader 1000 to be calibrated for the tag as there is a known resonant peak for the tag 800. The response obtained from the calibration resonators 902 is used during initial calibration to obtain background measurement data and when a tag 800 is read to obtain normalised values for the frequency response.

Tags 800 are produced by laser etching 1 micron aluminium film 104 on either BOPP (Biaxially Oriented Poly-Propylene) or Mylar substrate 102. Tags 800 can either be produced by etching the resonators 100 using a laser in one pass or tags 800 can be produced by selectively disabling fingers 110 of resonators 100 on pre-etched material.

Figure 10:
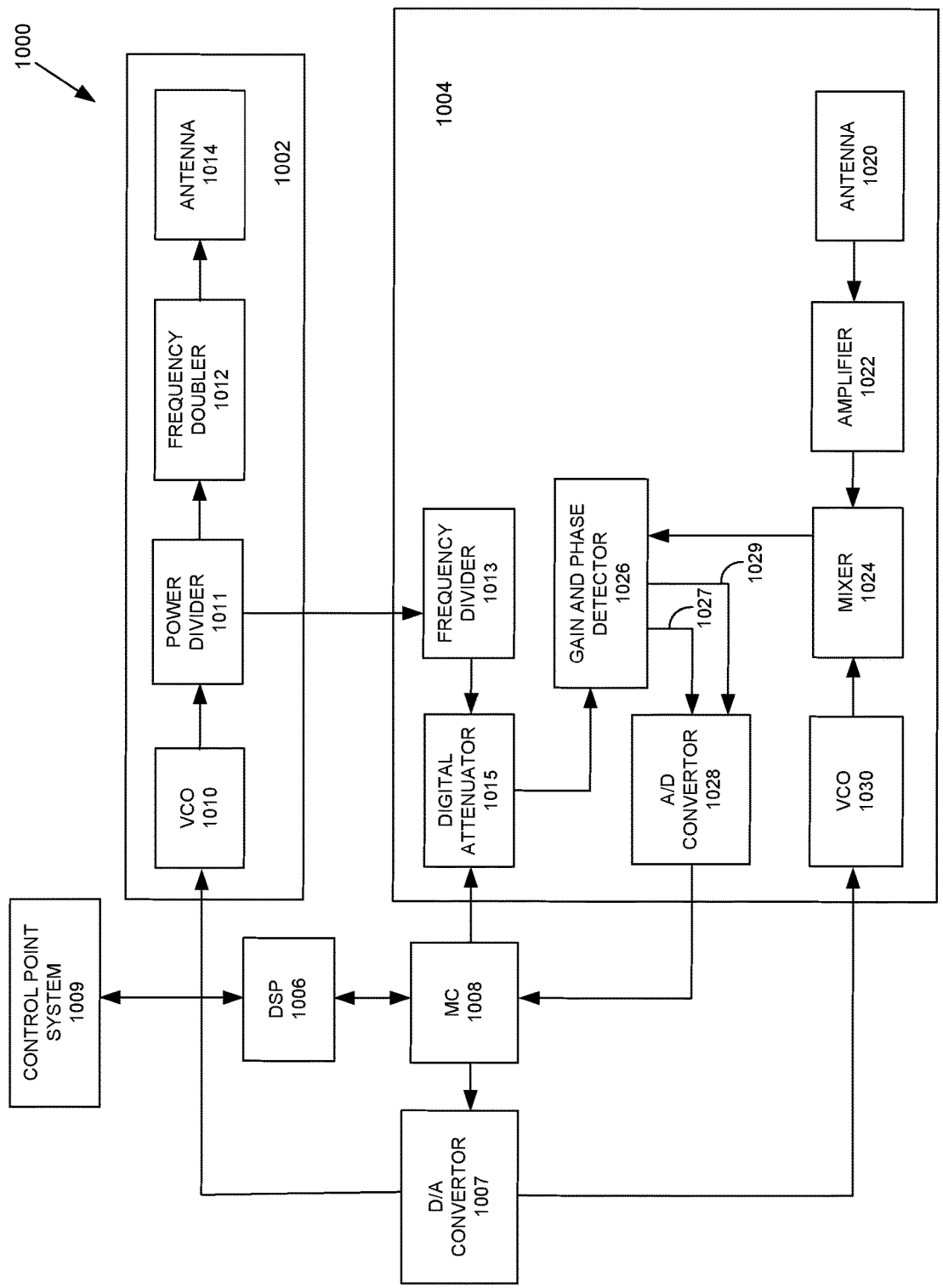
FIG. 10 is a block diagram of a preferred embodiment of an RFID reader for the tag.

A radio frequency identification (RFID) reader 1000 for the tag 800, as shown in FIG. 10, includes a transmitter 1002, a receiver 1004, a digital signal processor (DSP) 1006 and a controller circuit 1008. The reader 1000 also includes a digital to analog (D/A) convertor 1007 to generate a controllable voltage for voltage controlled oscillators (VCOs) 1010 and 1030 of the reader 1000. The D/A convertor 1007 operates on the basis of commands received from the controller circuit 1008, or can be incorporated into the controller circuit 1008. The controller 1008 is a microcomputer or microcontroller that is used to control the convertor 1007 and a variable digital attenuator 1015 of the reader 1000.

The transmitter 1002 includes a voltage controlled oscillator (VCO) 1010 to generate a radio frequency signal over the desired frequency band, and a frequency doubler 1012 to multiply and increase the input frequency to produce the carrier frequency signal which drives an antenna 1014 of the transmitter 1002. The frequency doubler 1012 upconverts the received signal to a microwave frequency. The frequency signal generated by the transmitter VCO 1010 is output to a power divider 1011 of the transmitter 1002 before it is passed to the frequency doubler 1012. The power divider 1011 separates the input frequency signal from the VCO 1010 into two output signals with the same frequency. The second output signal is passed to a frequency divider 1013 of the receiver 1004. The VCO 1010 is controlled by the D/A converter 1007 and the controller 1008 to exclude the discrete bands within the 20 to 30 GHz frequency band to meet regulatory requirements in different jurisdictions, e.g. the U.S. and Australia. The antenna 1014 transmits X polarised and Y polarised radio frequency signals at the carrier frequency across microwave frequency bands, i.e. within 20 to 30 GHz, and can be controlled to transmit one polarisation first and the other subsequently.

The receiver 1004 includes an antenna 1020, amplifier 1022, mixer 1024, power detector 1026, analog to digital converter (ADC) 1028 and a voltage controlled oscillator (VCO) 1030. The power detector 1026 is a gain and phase detector that receives the output of the mixer 1024 and provides a phase output 1027 on one channel and a gain output 1029 on another channel for the ADC 1028. The receiver 1004 also includes the variable digital attenuator 1015 that is controlled by the controller 1008. The frequency divider 1013 of the receiver 1004 down converts that transmitter signal received from the power divider 1011 to a frequency of around 2 GHz, in order to provide a reference signal that is output to the digital attenuator 1015 which in turn provides the transmitter reference signal to the gain and phase detector 1026. The attenuator 1015 however adjusts the reference signal it receives, under the control of the controller 1008, so as to ensure the reference signal has the same power as the signal received by the receiver 1004 that is output by the mixer 1024. The response received across the frequency band, i.e. 22 to 26.5 Ghz, by the receiver 1004 is non-linear, but the attenuator 1015 is controlled as sweeps are made across the band so that gain voltage response output by the detector 1026 is linear across the band. This is done by varying the attenuation applied to the reference signal at each resonant frequency based on calibration of the reader 1000 that takes into account the receiving power of the reader 1000 at each frequency.

The antenna 1020 of the receiver 1004 has a rotating head and receives radio frequency signals in one polarisation, i.e. the X polarisation, and then subsequently receives signals in another polarisation, i.e. the Y polarisation, as the head rotates. The controller 1008 controls the VCOs 1010 and 1030, via the D/A converter 1007, to ensure both the transmitter 1002 and the receiver 1004 are in alignment, synchronised and operating at the same carrier frequency, e.g. resonant frequency, as the frequency sweeps across the desired bands. As mentioned, discrete bands within the 20 to 30 GHz frequency band are excluded from the resonant frequencies in the tag 800 to meet regulatory requirements in different jurisdictions, e.g. the U.S. and Australia.

The reader 1000 has two modes of operation:

(i) The reader 1000 transmits power at the tag 800 in 50 MHz steps during a sweep, and each frequency is transmitted for 10 ms. The receiving antenna 1020 is next to the transmitting antenna 1014, and the tag 800 reflects power back at receiving antenna 1020 with peaks at resonant frequencies.

(ii) The reader 1000 transmits power at the tag 800 in 50 MHz steps during a sweep, and each frequency is transmitted for 10 ms. The receiving antenna 1020 is opposite the transmitting antenna 1014, and the tag 800 transmits power through to the receiving antenna 1020 with peaks at resonant frequencies.

The radio frequency signal received by the receive antenna 1020 is output to the amplifier 1022 which is a two stage amplifier that increases the magnitude of the received signal so it is comparable with the local oscillator (LO) signal generated by the VCO 1030. The output of the amplifier 1022 is passed to the mixer 1024. The VCO 1030 of the receiver 1004 generates the LO signal for the mixer 1024 which down converts the received RF signal from the amplifier 1022 to an intermediate frequency (IF) signal. The receiver 1004 converts received power of the IF signal to a voltage proportional to the power at the power detector 1026. The voltage is then converted to a digital value by the ADC 1028. The receiver is synchronised with the transmitting section so the receiver 1004 returns a digital value for each transmitted resonant frequency. In particular, the detector 1026 measures the difference between the gain of the received IF signal and the gain of the reference signal received from the digital attenuator 1015 and a voltage representing this difference as output on the gain channel 1029. Similarly, the detector 1026 also measures the difference in phase between the phase of the received IF signal, and the phase of the reference signal received from the attenuator 1015 and outputs the voltage representative of this difference on the phase channel 1027. The ADC 1028 converts the voltages to digital values for output to the controller 1008, which are then passed to the DSP 1006 as measurement data for each resonant frequency.

The DSP 1006 operates so before reading a tag 800 the reader 1004 measures the background, e.g. the digital values at each frequency when there is no tag present. This background is subtracted from the received levels when reading a tag 800. Periodically the reader 1004 is calibrated with tags 800 that have all resonators turned on and all resonators turned off. Accordingly when reading a tag 800 this enables the calibration resonators 902 to be detected and the signal is adjusted on the basis of the known calibration resonator resonate frequency. After adjustment the amplitude or power levels returned at the resonate frequencies are detected using a Fourier Transform process executed by the DSP 1006 and the encoded bit pattern is extracted to provide the unique identification code of the tag 800.

Distinguishing a tag from ambient and microwave noise or a piece of metal within the radio frequency field of the reader 1000 can present significant difficulties as noise or stray reflections can have a similar profile to radiation from an RFID tag's resonators. Providing a tag 800 with a predetermined layout of resonators generates a predictable RF signal response, particularly if a number of fixed standard on resonators 902 are included in every tag 800 which can be detected by the reader 1000 at the calibration frequency. This subset 902 of resonators of the tag 800 enables the reader 1000 to determine if an RFID tag is within the radio frequency field of a reader and then secondly to determine whether it is a tag of the type of the tag 800 with the predetermined layout. The reader 1000 is able to use sensitive microwave frequency components that are sensitive to ambient temperature and actually drift to their response over time as the DSP 1006 and the controller 1008 can dynamically adjust the settings of the reader's components using the response obtained from the resonators of the calibration subset 902. This dynamic adjustment caters for a frequency response that varies and which is affected by the temperature/humidity of the environment and the character of any materials between the reader 1000 and the tag 800. This is achieved by the controller 1008 using the attenuator circuit 1015 to adjust the relative sensitivity of the receiver 1004 at different frequencies across a sweep, and the DSP 1006 normalising the frequency response of the reader 1000 based on the response obtained from the calibration resonators 902. The calibration takes into account the ambient environment and by checking the response when no tag is present, the reader 1000 can be dynamically adjusted using the attenuator 1015 and the DSP 1006 to take into account changes in the ambient conditions.

Figure 11:
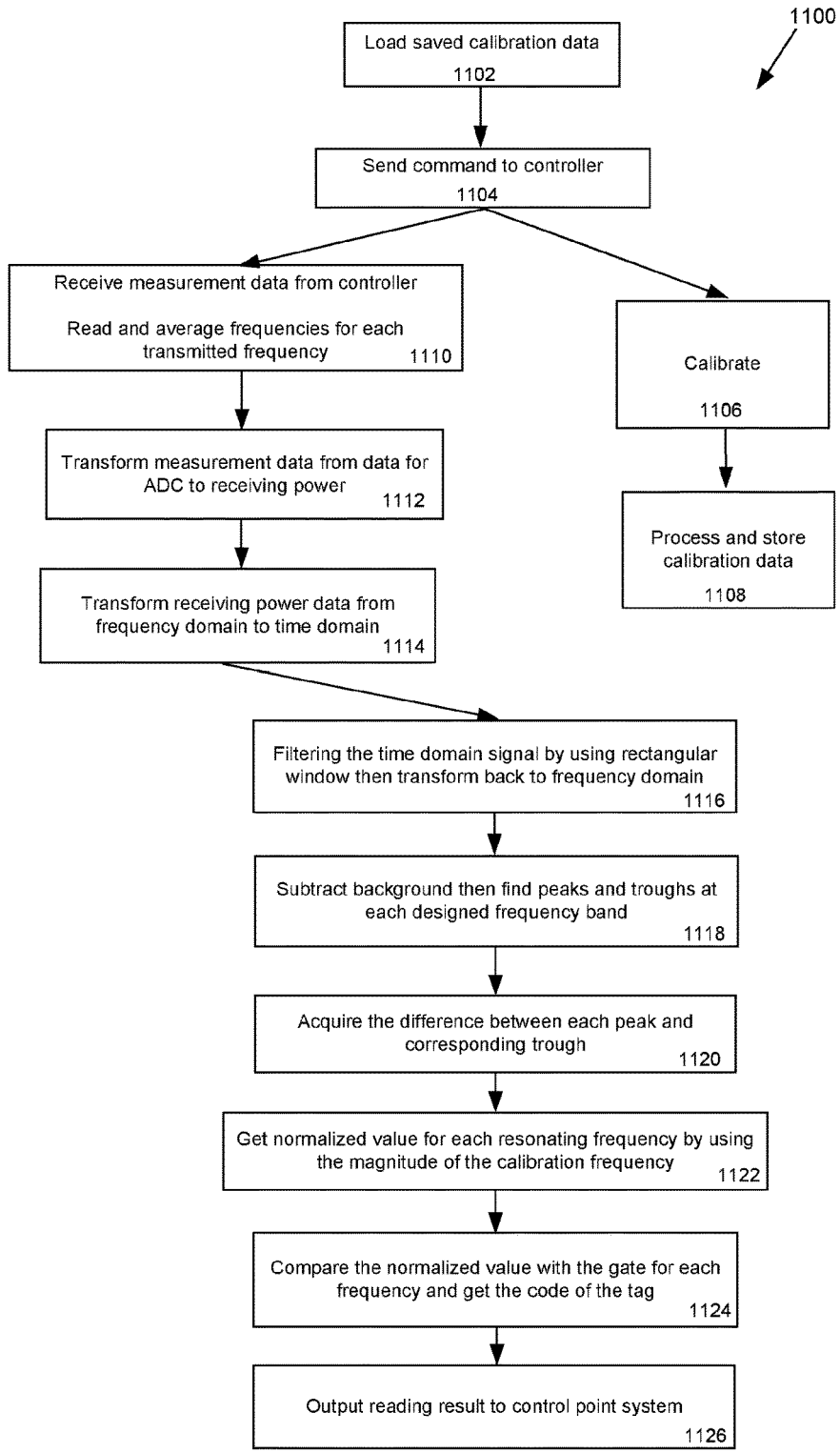
FIG. 11 is a flow diagram of the signal processing executed by a digital signal processor of the RFID reader.

The DSP 1006 can be provided by a single board computer that receives the data obtained by the controller 1008. The DSP 1006 includes computer readable memory that stores computer program code, i.e. firmware or software, to execute a reader signal processing method 1100, as shown in FIG. 11. Alternatively FPGAs or ASICs of the DSP execute at least some of the steps of the method 1100. The DSP first loads any stored calibration data at step 1102. A measurement sweep command is then sent to the controller 1008 (1104).

If a calibration button (not shown) of the reader 1000 is selected, then the method 1100 enters a calibration process where the controller 1008 controls the VCOs 1010, 1030 to perform a measurement sweep across the resonant frequencies (1106) to obtain measurement data from the A/D converter 1028 (1108). The measurement data is processed and used and stored as calibration data. The calibration process (1106, 1108) is performed with a known tag 800 within range of the reader 1000, such as a tag 800 with all resonators off except the calibration subset 902. Calibration can be performed as desired, such as every few hours or days, to take into account ambient conditions. The calibration process (1106, 1108) reads the known tag using the normal read process, i.e. frequency sweep, and uses the last stored calibration data. Since a known tag is being read, the response required is known, and the measurement data is processed (1108) in order to set the calibration data so that the known tag is read correctly in the current environment, and the correct or adjusted calibration data is stored and used for subsequent reads. The calibration data stored in the microcontroller 1008 is used to adjust the attenuation applied by the attenuator 1015 to the reference signal during a sweep. It is also used by the DSP 1006 to remove the ambient background from the frequency response as discussed below.

If the calibration button is not depressed, then the sweep command sent to the controller (1104) causes the controller 1008 to perform a normal frequency sweep to obtain measurement data across the transmitted frequency bands from the A/D converter 1028 (1110). For each transmitted frequency a number of frequencies above and below the transmitted frequency, i.e. side band frequencies, are received and the values obtained for all of the received frequencies are read and averaged for each transmitted frequency. This averaging is either performed by the controller 1008 or the DSP 1006. The measurement data obtained is then transformed across each frequency scale into dB level values for the power (i.e. gain) values (1112). The db power level data and the phase data of the measurement data is then transformed from the frequency domain to the time domain (1114). This time domain signal is then filtered using a rectangular band pass window to remove background noise and sharpen peaks in the signal, and then it is transformed back to the frequency domain (1116). The calibration data that has been loaded is then used to obtain difference values by subtracting it from the filtered measurement data. This effectively subtracts the ambient background. The difference values are then processed to find the peaks and the troughs at each resonant frequency band (1118). The difference between each peak and trough is determined (1120) in order to detect which one of the four amplitudes and zero has been received at each frequency band. A normalised value is then obtained for each amplitude at each resonant frequency by using the amplitude value obtained at the calibration frequency for the subset 902 (1122). The normalised value is derived by measuring the actual power value received at the calibration frequency from the tag, scaling this power value by a scaling factor to a predetermined reference value and then the same scaling factor is applied to the other frequencies to produce a normalised set of values for the resonant frequencies. The normalised value is then compared with a threshold value, corresponding to the gate or gap g of each resonator 100 for each resonant frequency to obtain the bits for each resonant frequency and determine the code of the tag 800 (1124). The code obtained is output as a reading result to a control point system 1009, and this transmission may be wireless, e.g. Bluetooth. The control point system 1009, which may be a communications network based server, is used to convert the output data generated by the DSP 1006, that represents a tag reading result, into a form that is suitable for other systems.

The microwave antennas 1014 and 1020 operate in either Near field or Far field mode. For transmitter antenna 1014 in Far field mode, the field is predictable across the transmitted beam, and in Near field mode the field is not predictable across the beam width and should be measured. Similar effects occur for the receiving antenna 1020. The reader 1004 works best when used in reflection (both antennas 1014, 1020 on same side of the tag 800) and both transmitter 1002 and receiver 1004 in Near field. When used in transmission, the reader 1004 works best within the transmitter 1002 in Near field and receiver 1004 in Far field mode.

Figure 12:
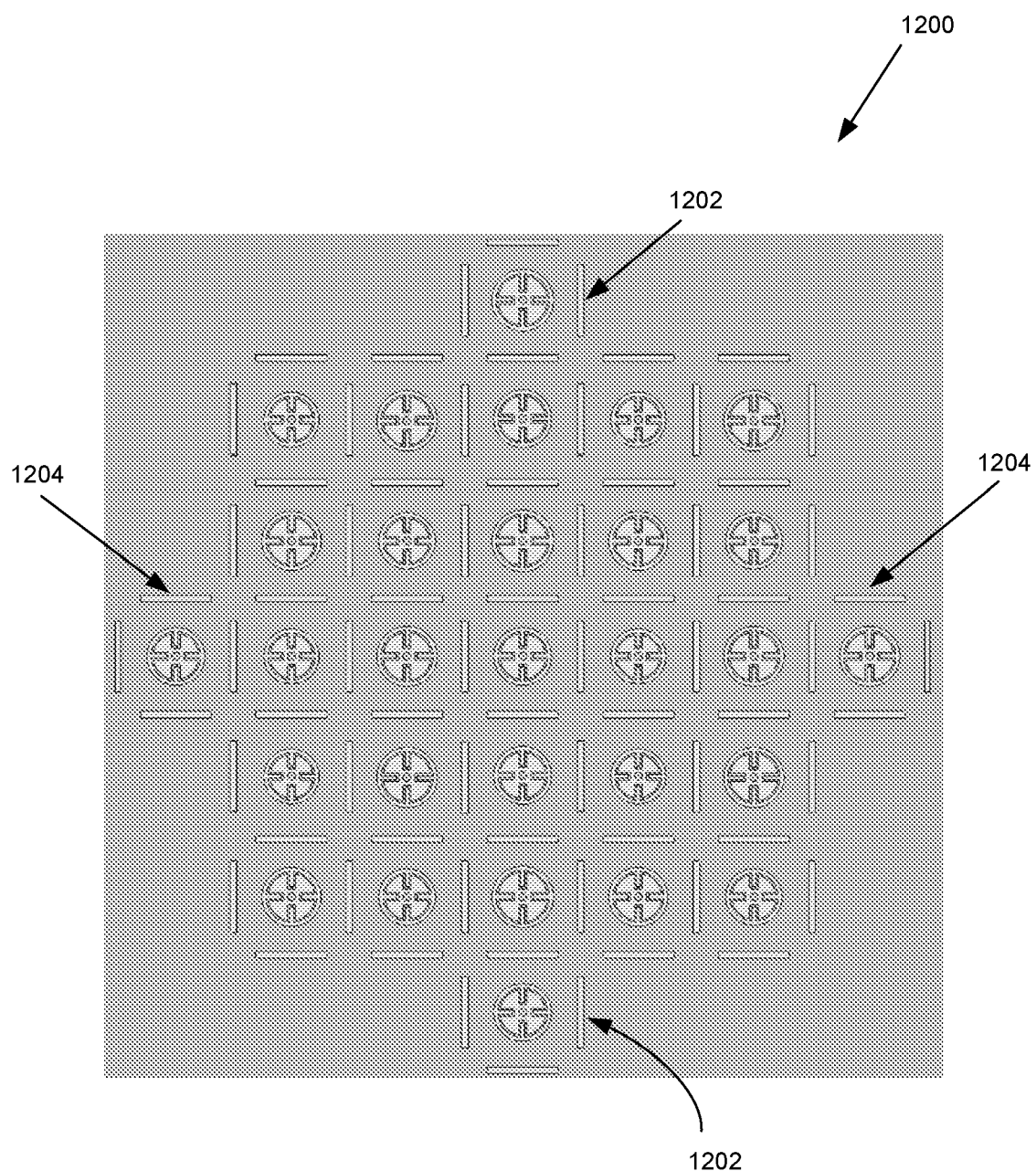
FIG. 12 is a plan view of an alternative layout of the RFID tag with 29 resonators and cross bars.
Figure 13:
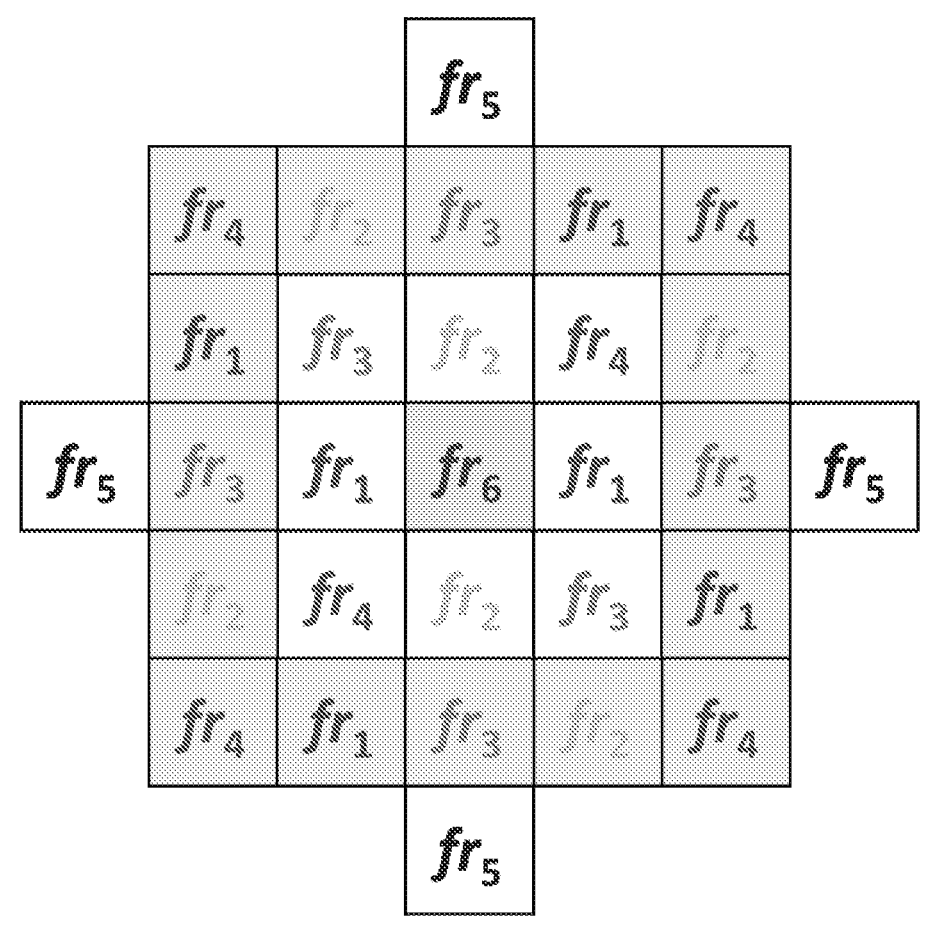

Another form of the RFID tag 800 is shown in FIGS. 12 and 13 to provide an RFID tag 1200 with 29 resonators 100 and cross bars 600 again included to reduce mutual coupling between the resonators 100. The resonators 100 are, however, arranged in a 5×5 array of resonators where the centre column is extended by two additional resonators 1202 and the centre row is extended by two additional resonators 1204. The tag 1200 is based on one resonator 100 in the centre and three square rings of resonators disposed about and centred on the centre resonator. The third outermost ring only has the four resonators 1202, 1204. As shown in FIG. 13, the frequency allocation for the resonators 100 is such that the resonator located in the centre operates at the sixth resonant frequency ($f_6$). On the first ring, there are eight resonators that operate at the lower four frequencies ($f_1$, $f_2$, $f_3$, $f_4$) with two resonators for each frequency that are opposite each other. On the second ring, there are sixteen resonators operate at the lower four frequencies ($f_1$, $f_2$, $f_3$, $f_4$) with four resonators for each frequency that either opposite each other or as far apart as possible. All of the resonators are located symmetrically. On the outermost ring, the four resonators 1202, 1204 operate at the fifth resonant frequency ($f_5$) and are also located symmetrically. The four resonators that operate at $f_5$ are turned on to work as the calibration subset of resonators and the centre resonator that operates at $f_6$ is turned on to establish a clear trough for a peak at the calibration frequency $f_5$. The total bit capacity of a tag is 20.68 which equals to 1679965.

The tag 1200 can provide better performance in a rotation test because it has a more symmetrical layout than the tag 800. In addition, the tag 1200 has better bit capacity than the 6×4 tag 800 and has a slightly smaller size. The diameter of a circle in which the tag 800 can fit is slightly larger than the same diameter of the tag 1200. The smaller diameter can provide better performance in a displacement test, which a test that evaluates the amount a tag can be moved side to side before reading performance (i.e. the ability of the reader 1000 to successfully read a tag) drops off.

Many modifications will be apparent to those skilled in the art without departing from the scope of the present invention as herein described.

The invention claimed is:

1. A radio frequency identification (MD) reader for a tag, including:
   a transmitter with a local oscillator to transmit radio frequency signals in sweeps across desired resonant frequency bands to the tag; and
   a receiver synchronized to receive and process non-linear radio frequency signals of the desired frequency bands from the tag, the receiver comprising:
      a variable attenuator controlled by a controller configured to receive a reference signal provided ay a power divider of the reader and down converted by a frequency divider of the reader representing the transmitted radio frequency signals and adjust the reference signal for the receiver at different frequencies across the bands to control the sensitivity of the receiver, the variable attenuator further configured to be controlled by varying attenuation applied to the reference signal at each resonant frequency of the desired resonant frequency bands such that a gain voltage response output by a gain and phase detector is linear across the bands, the gain and phase detector electrically connected to an output of the variable attenuator.

2. The RFID reader as claimed in claim 1, wherein the variable attenuator is configured to adjust the reference signal such that the reference signal has the same power as the radio frequency signals received by the receiver.

3. The RFID reader as claimed in claim 1, wherein the reader is configured to be dynamically adjusted using the variable attenuator to take into account changes in ambient conditions.

4. The RFID reader as claimed in claim 3, wherein the ambient conditions comprise one or more of temperature, humidity and a character of any materials interposed between the reader and the tag.

5. The RFID reader as claimed in claim 1, further comprising a controller configured to control the transmitter and the receiver, wherein the controller is further configured to store calibration data configured to calibrate the RFID reader based on the non-linear radio frequency signals received by the receiver, and wherein the variable attenuator is further configured to vary attenuation applied to the reference signal based on the calibration data.

6. A radio frequency identification (RFID) reader for a tag, including:
   a transmitter with a local oscillator to transmit radio frequency signals in sweeps across desired resonant frequency bands to the tag; and
   a receiver synchronized to receive and process radio frequency signals of the desired frequency bands from the tag, the receiver comprising:

a variable attenuator controlled by a controller configured to receive a reference signal provided ay a power divider of the reader and down converted by a frequency divider of the reader representing the transmitted radio frequency signals and adjust the reference signal for the receiver at different frequencies across the bands to control the sensitivity of the receiver;

a frequency divider configured to down convert the radio frequency signals received from the transmitter and output the down converted frequency signals as the reference signal to the variable attenuator; and a gain and phase detector configured to receive an intermediate frequency generated by an oscillator of a receiver of the reader and downconverted by a mixer of the reader signal and the reference signal, to measure the difference between a gain or phase of the intermediate frequency signal and a gain or phase of the reference signal, and to output a voltage representing the measured gain or phase difference; and a controller configured to control the transmitter and the receiver.

7. The RFID reader as claimed in claim 6, wherein the transmitter comprises a power divider configured to divide a received frequency signal into first and second output frequency signals having the same frequency, and to pass the second output frequency to the frequency divider of the receiver.

8. A radio frequency identification (RFID) reader for a tag, including:

a transmitter with a local oscillator to transmit radio frequency signals in sweeps across desired resonant frequency bands to the tag;

a receiver synchronized to receive and process radio frequency signals of the desired frequency bands from the tag, the receiver including a variable attenuator controlled by a controller configured to receive a reference signal provided by a power divider of the reader and down converted by a frequency divider of the reader representing the transmitted radio frequency signals and adjust the reference signal for the receiver at different frequencies across the bands to control the sensitivity of the receiver; and a signal processor configured to normalize a frequency response of the receiver based on a response obtained from calibration resonators configured to respectively resonate at a calibration frequency, the normalized frequency response comprising a normalized set of values for resonant frequencies of the bands, the signal processor configured to measure an actual power value received at the calibration frequency, scale the measured power value by a scaling factor to a predetermined reference value, and apply the same scaling factor to the resonant frequencies to produce the normalized set of values for the resonant frequencies.

9. The RFID reader as claimed in claim 8, wherein the signal processor is further configured to compare the normalized set of values with a threshold corresponding to a gap of each resonator to obtain bits for each resonant frequency.

* * * * *